United States Patent
Kodera et al.

(10) Patent No.: US 11,738,709 B2
(45) Date of Patent: Aug. 29, 2023

(54) AIR BAG BASE CLOTH AND AIR BAG

(71) Applicant: SEIREN CO., LTD., Fukui (JP)

(72) Inventors: Shota Kodera, Fukui (JP); Tsuyoshi Houraiya, Fukui (JP)

(73) Assignee: SIREN CO., LTD., Fukui (JP)

(*) Notice: Subject to any disclaimer, the term of this patent is extended or adjusted under 35 U.S.C. 154(b) by 0 days.

(21) Appl. No.: 16/760,483

(22) PCT Filed: Oct. 31, 2018

(86) PCT No.: PCT/JP2018/040538
§ 371 (c)(1),
(2) Date: May 7, 2020

(87) PCT Pub. No.: WO2019/088177
PCT Pub. Date: May 9, 2019

(65) Prior Publication Data
US 2021/0197751 A1    Jul. 1, 2021

(30) Foreign Application Priority Data

Nov. 1, 2017   (JP) ................................ 2017-211819

(51) Int. Cl.
*B60R 21/235*      (2006.01)
*D06N 3/12*        (2006.01)

(52) U.S. Cl.
CPC ........... *B60R 21/235* (2013.01); *D06N 3/128* (2013.01); *B60R 2021/23514* (2013.01); *D06N 2203/066* (2013.01); *D06N 2211/268* (2013.01); *D10B 2331/04* (2013.01); *D10B 2505/124* (2013.01)

(58) Field of Classification Search
None
See application file for complete search history.

(56) References Cited

U.S. PATENT DOCUMENTS

| | | | |
|---|---|---|---|
| 5,401,566 A | 3/1995 | Magee | |
| 2012/0043745 A1 | 2/2012 | Bae et al. | |
| 2012/0289114 A1 | 11/2012 | Kim et al. | |
| 2013/0106081 A1 | 5/2013 | Kim et al. | |
| 2018/0208147 A1 | 7/2018 | Yokoi | |
| 2018/0281737 A1 | 10/2018 | Houraiya | |
| 2019/0071048 A1 | 3/2019 | Akechi | |

FOREIGN PATENT DOCUMENTS

| | | |
|---|---|---|
| CN | 102458933 A | 5/2012 |
| CN | 102656299 A | 9/2012 |
| CN | 102933756 A | 2/2013 |
| CN | 103541224 A | 1/2014 |
| CN | 106319720 A | 1/2017 |

(Continued)

OTHER PUBLICATIONS

International Search Report, issued in PCT/JP2018/040538, PCT/ISA/210, dated Jan. 29, 2019.

(Continued)

*Primary Examiner* — Arti Singh-Pandey
(74) *Attorney, Agent, or Firm* — Birch, Stewart. Kolasch & Birch, LLP

(57) ABSTRACT

An air bag base cloth according to the present invention includes a base cloth main body formed of synthetic fibers, and a synthetic resin layer with which at least one face of the base cloth main body is coated, and the moisture content measured in accordance with JIS L 1096.8.10 is 0.5% or less.

7 Claims, 2 Drawing Sheets

(56) References Cited

FOREIGN PATENT DOCUMENTS

| | | |
|---|---|---|
| GB | 882892 A | 11/1961 |
| JP | 6-81274 A | 3/1994 |
| JP | 2002-88657 A | 3/2002 |
| JP | 2002-275729 A | 9/2002 |
| JP | 2010-174390 A | 8/2010 |
| KR | 10-2010-0119519 A | 11/2010 |
| WO | WO 2017/010458 A1 | 1/2017 |
| WO | WO 2017/057300 A1 | 4/2017 |
| WO | WO 2017/159583 A1 | 9/2017 |

OTHER PUBLICATIONS

Written Opinion of the International Searching Authority, issued in PCT/JP2018/040538, PCT/ISA/237, dated Jan. 29, 2019.
Chinese Office Action and Search Report for Chinese Application No. 201880070687.2, dated Dec. 3, 2021, with English translation.
Extended European Search Report for European Application No. 18874229.0, dated Oct. 15, 2021.
Chinese Office Action and Search Report for Chinese Application No. 201880070687.2, dated Aug. 9, 2022, with an English translation of Chinese Office Action.
Japanese Office Action for Japanese Application No. 2019-550460, dated Sep. 6, 2022, with an English translation.

AIR BAG BASE CLOTH AND AIR BAG

TECHNICAL FIELD

The present invention relates to a base cloth used in an air bag that is in widespread use as a device for occupant protection at the time of a vehicle collision, and particularly to a coated air bag base cloth and an air bag obtained from the same.

BACKGROUND ART

An air bag device is widely provided in a vehicle as a safety device for occupant protection that protects an occupant from impact when a vehicle undergoes a collision. In recent years, in addition to air bags to be deployed from in front of the driver's seat and from in front of the passenger's seat, curtain air bags to be deployed from lateral sides of a vehicle have been increasingly provided.

Curtain air bags are provided for the purpose of protecting a front seat as well as a rear seat in case of a lateral collision of a car, and thus have a horizontally long shape. Accordingly, parts included in the curtain air bag are longer than those included in the driver-side air bag and the passenger-side air bag. Therefore, there is demand for shape retainability to an extent that a significant change in the size and the shape of an air bag base cloth is prevented.

To solve these problems, Patent Literature 1 discloses a method in which the dry heat shrinkage ratios in the vertical and horizontal directions of a fabric made of polyamide when the fabric is heated at 150° C. for 30 minutes are set to 4% or less and thus a fabric for an air bag with excellent shape retainability is produced.

CITATION LIST

Patent Literature

Patent Literature 1: JP 2010-174390A

SUMMARY OF INVENTION

Technical Problem

However, the environment in a vehicle varies significantly depending on the season and the weather, and there is demand for better shape retainability. It is an object of the present invention to provide an air bag base cloth with improved shape retainability, and an air bag including the air bag base cloth.

Solution to Problem

An air bag base cloth according to the present invention includes a base cloth main body formed of synthetic fibers, and a synthetic resin layer with which at least one face of the base cloth main body is coated, wherein the moisture content measured in accordance with JIS L 1096.8.10 is 0.5, or less.

In the above-mentioned air bag base cloth, polyethylene terephtalate can be used as a main material of the fibers included in the base cloth main body.

In the above-mentioned air bag base cloths, silicone resin can be used as a main material of the synthetic resin layer.

In the above-mentioned air bag base cloths, the base cloth main body can be coated with the synthetic resin layer in an amount of 10 to 50 g/m².

In the above-mentioned air bag base cloths, the weave density of yarn of the base cloth main body can be 48 to 68 yarns/2.54 cm.

In the above-mentioned air bag base cloths, the number of yarn filaments in the base cloth main body can be 72 to 182 filaments.

An air bag according to the present invention is formed of at least one of the above-described air bag base cloths.

Advantageous Effects of the Invention

It is possible to provide an air bag base cloth with excellent shape retainability against seasonal variation and changes in weather, and an air bag including the air bag base cloth.

DESCRIPTION OF EMBODIMENTS

Figure 1:
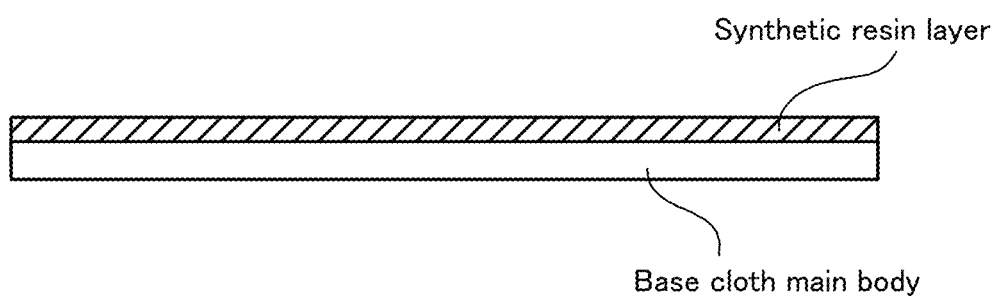
FIG. 1 is a cross-sectional view showing an embodiment of an air bag base cloth according to the present invention.

As shown in FIG. 1, an air bag base cloth of the present invention includes a base cloth main body formed of synthetic fibers, and a synthetic resin layer with which at least one face of the base cloth main body is coated, wherein the moisture content measured in accordance with JIS L 1096.8.10 is 0.5% or less.

It is important to set the moisture content of the base cloth to 0.5% or less, preferably 0.4% or less, and more preferably 0.3% or less. When the moisture content of the base cloth is set to 0.5% or less, a change in volume due to moisture absorption between a dry state and a wet state is reduced, and thus the shape retainablility regardless of a change in humidity is improved.

It is preferable that the base cloth main body is woven using one or more types of fibers selected from polyester-based fibers such as polyethylene terephthalate fibers and polybutylene terephthalate fibers, polyolefin-based fibers such as polyethylene fibers and polypropylene fibers, fluorine-based fibers such as polytetrafluoroethylene fibers, and polyphenylene sulfide fibers. These fibers have a low hydrophilicity due to their chemical structures, and thus the moisture content of an air bag base cloth made of such fibers can be suppressed to a low level. In particular, it is more preferable to use polyethylene terephthalate fibers out of these fibers from the viewpoint of the strength and thermal resistance required for an air bag, and cost.

The yarns included in the above-mentioned base cloth main body preferably have a total fineness of 280 dtex or more. When the total fineness of the yarns is 280 dtex or more, the strength of the base cloth becomes superior for an air bag. The total fineness is preferably 560 dtex or less, and more preferably 470 dtex or less, because a lightweight base cloth can be easily obtained. The number of filaments is preferably 72 to 182, more preferably 72 to 144, and even more preferably 72 to 105. In the present invention, the number of filaments may be relatively small as described above. The reason for this is that the air bag base cloth of the present invention includes a synthetic resin layer and thus has a low air permeability even though the number of filaments is not increased. In addition, the surface area of the yarns in the entire base cloth main body is thus reduced, which contributes to a reduction in the above-described moisture content.

Although the yarns included in the base cloth main body may have the same single fiber fineness (=total fineness/number of filaments) or different single fiber finenesses, the single fiber fineness is preferably in a range from 1.0 dtex to 5.5 dtex, and more preferably in a range from 1.0 dtex to 3.5 dtex, for example. When the single fiber fineness is set to 5.5 dtex or less, the flexibility is increased, thus making it possible to improve the foldability of the air bag. The single fiber fineness is preferably 1.0 dtex or more because the single fibers are unlikely to break in the spinning process, the weaving process, and the like.

Also, it is sufficient that the cross-sectional shape of a single fiber is selected from a circle, an ellipse, a flattened shape, a polygon, a hollow shape, other variants, and the like. Itis sufficient that mixed fibers, doubling threads, combined use threads, mixed use threads thereof (the warp and the weft have different cross-sectional shapes), or the like are used as needed, and the cross-sectional shape is selected as appropriate to the extent that the spinning process, the fabric manufacturing process, the fabric physical properties and the like are not hindered.

One or more of various additives that are used to improve spinnability, processability, durability, and the like of fibers may be used for these fibers. Examples of the additives include a heat-resistant stabilizer, an antioxidant, a light-resistant stabilizer, an aging resister, a lubricant, a smoothing agent, a pigment, a water repellent agent, an oil-repellent agent, a masking agent such as titanium oxide, a gloss imparting agent, a flame retardant, and a plasticizer.

It is sufficient that the texture of the base cloth main body is selected from woven textures such as a plain weave, a mat weave (basket weave), and a check weave (rip-stop weave), knitted textures such as circular knitting, and tricot knitting, and non-woven fabric textures. In particular, a plain weave is preferable in terms of ensuring the tightness of the structure, the physical properties, and the evenness of the performance.

When the texture of the base cloth main body is a plain weave, its weave density is preferably 48 to 68 yarns/2.54 cm, more preferably 48 to 55 yarns/2.54 cm, and even more preferably 48 to 52 yarns/2.54 cm, in terms of both the warp and the weft, in consideration of the performance such as weavability and air permeability. Since the air bag base cloth according to the present invention includes the synthetic resin layer, the air permeability is reduced without increasing the weave density. On the other hand, increasing the weave density is not preferable because the weight increases. Accordingly, as mentioned above, a relatively small weave density does not become problematic. Moreover, the surface area of the yarns in the entire base cloth main body is reduced by reducing the weave density, which contributes to a reduction in the above-described moisture content.

It is preferable that the synthetic resin layer with which the base cloth main body is coated is made of one or more resins selected from silicone resin, acrylic resin, polyurethane resin, polyester resin, polyolefin resin, and phenol resin. In particular, it is preferable to use silicone resin or acrylic resin from the viewpoint of combustibility and long-term durability, and silicone resin is particularly preferable.

Examples of the main component of the silicone resin include polymers containing, as the main chain, a polydimethylsiloxane, which is a linear polysiloxane including a methyl group at the side chain, and modified polysiloxanes obtained by substituting a methyl group with an amino group, a phenol group, or an epoxy group. Out of these resins, silicone resin whose main component is a polymer containing polydimethylsiloxane as the main chain is preferable because the hydrophilicity of the resin can be reduced, and the manufacturing cost can be reduced.

The weight (application amount) of the synthetic resin per unit area of the base cloth main body that is coated with the synthetic resin is preferably in a range of 10 to 50 $g/m^2$. When it is 10 $g/m^2$ or more, low air permeability and thermal resistance that are required for a coated cloth can be obtained. When it is 50 $g/m^2$ or less, both high performance and a reduction in weight can be achieved. Since the synthetic resin may have an influence on the above-described moisture content, it is preferable that the weight thereof is smaller. The weight thereof is preferably 40 $g/m^2$ or less, more preferably 30 $g/m^2$ or less, and even more preferably 20 $g/m^2$ or less. It should be noted that one or both of the faces of the base cloth main body may be coated with the synthetic resin layer.

An air bag of the present invention can be obtained by joining at least one base cloth piece obtained by cutting the above-described base cloth into a desired shape. It is preferable that all of the base cloth pieces included in the air bag are formed of the above-mentioned base cloth. It is sufficient that the specifications, shape, and volume of the air bag are selected in accordance with the site at which the air bag is to be arranged, the application, storage space, the ability to absorb occupant impact, the output of the inflator, and the like. Furthermore, a reinforcing cloth may be added in accordance with performance requirements. The reinforcing cloth can be selected from a coated base cloth that is equivalent to the base cloth piece, a coated base cloth that is different from the base cloth piece, and a non-coated base cloth that is different from the base cloth piece.

The joining of the above-mentioned base cloth pieces, the joining of the base cloth piece and a reinforcement cloth or a hanging string, and the fixing of other cut base cloths to each other are performed mainly through sewing, but it is possible to use partial adhesion, welding, or the like in combination, or use a joining method using weaving or knitting as long as the air bag has sufficient robustness, impact resistance at the time of deployment, ability to absorb occupant impact, and the like to function as an air bag.

It is sufficient that cut base cloths are sewn together using a sewing method that is applied to a normal air bag, such as lock stitching, multi-yarn chain stitching, one side down stitching, looping, safety stitching, zigzag stitching, flattened stitching, or the like. Also, it is sufficient that the fineness of the sewing thread is 700 dtex (corresponding to #20) to 2,800 dtex (corresponding to #0), and the stitch count is 2 to 10 stitches/cm. If stitch lines in a plurality of rows are required, it is sufficient that a multi-needle sewing machine with the distance between stitch lines being about 2 mam to 8 mm is used, but if the distance of a sewing portion is not long, sewing may be performed using a single-needle sewing machine a plurality of times. If an air bag main body is formed of a plurality of base cloths, a plurality of base cloths may be sewn together in a stacked state, or sewn together one by one.

It is sufficient that the sewing thread used for sewing is selected as appropriate from threads that are generally called synthetic threads and threads that are used as industrial sewing threads. Examples thereof include nylon 6 yarns, nylon 66 yarns, nylon 46 yarns, polyester yarns, macromolecular polyolefin yarns, fluorine-containing yarns, vinylon yarns, aramid yarns, carbon yarns, glass yarns, and steel yarns, and any of a spun yarn, a filament twisted yarn, or a processed filament resin yarn may be used.

Furthermore, in order to prevent gas leaking from stitches in the outer circumferential sewing portions or the like, a sealing material, an adhesive, an adhering material, or the like may be applied to, sprayed onto, or stacked on upper portions and/or lower portions of stitches, gaps between stitches, a seam margin, or the like.

The air bag base cloth according to the present invention can be applied to various air bags such as a driver-side air bag, a passenger-side air bag, a side air bag, and a side curtain air bag. In particular, a side curtain air bag is long in size, and therefore, it is particularly advantageous to use an air bag base cloth with high shape retainability as that of the present invention for a side curtain air bag.

WORKING EXAMPLES

Hereinafter, the present invention will be more specifically described based on working examples, but the present invention is not limited to these working examples. Working examples and comparative examples below are air bag base cloths obtained by coating one face of a base cloth main body made of a synthetic fiber fabric with a synthetic resin layer. It should be noted that methods for evaluating the properties and performance of the air bag base cloth that were performed in the working examples and comparative examples will be described below.

Total Fineness of Yarns
Measurement was performed in accordance with method B in JIS L 1013 8.3.1.

Number of Yarn Filaments
Measurement was performed in accordance with in JIS L 1013 8.4.

Single Fiber Fineness
The fineness was obtained by dividing the total fineness by the number of yarn filaments.

Weave Density of Fabric
Measurement was performed in accordance with method A in JIS L 1096 8.6.1.

Thickness of Fabric
Measurement was performed in accordance with method A in JIS L 1096 8.4.

Moisture Content
Measurement was performed in accordance with JIS L 1096.8.10.

Humidity Cycling Shrinkage Ratio and Shape Stability Against Moisture
The obtained air bag base cloth was cut equally in the width direction of the base cloth to obtain five square test pieces with sides having a length of 10 cm in the warp direction of the base cloth and a length of 10 cm in the weft direction thereof. The cut test pieces were placed in a thermo-hygrostat incubator capable of programming the temperature/humidity condition in the incubator. The program was set such that a condition of 80° C. and 95% was applied for two hours and a condition of 22° C. and 65% was applied for two hours, and these settings were alternately repeated. One round of repeating was taken as one cycle, and this cycle was repeated three times. After the treatment, the lengths of the test pieces in the warp direction and the weft direction were measured, and the shrinkage ratios with respect to a length of 10 cm, which was a length before the treatment, were calculated. In addition, the shapes of the test pieces after the treatment were observed, and evaluated as A to C based on deformation or warping. The test pieces that were not deformed and warped at all were evaluated as A, the test pieces that were slightly deformed or warped were evaluated as B, and the test pieces that were significantly deformed or warped were evaluated as C. Table 1 below shows the results.

TABLE 1

| | | Work. Ex. 1 | Work. Ex. 2 | Work. Ex. 3 | Comp. Ex. 1 | Comp. Ex. 2 | Comp. Ex. 3 |
|---|---|---|---|---|---|---|---|
| Material of base cloth | | PET | PET | PET | PA66 | PA66 | PA66 |
| Total fineness | dtex | 470 | 470 | 470 | 470 | 470 | 470 |
| Number of filaments | filaments | 96 | 96 | 96 | 72 | 72 | 72 |
| Single fiber fineness | dtex | 4.9 | 4.9 | 4.9 | 6.5 | 6.5 | 6.5 |
| Weave density | Warp direction | yarns/2.54 cm | 51 | 51 | 51 | 51 | 46 | 46 |
| | Weft direction | | 51 | 51 | 51 | 51 | 46 | 46 |
| Application amount | g/m$^2$ | 15 | 25 | 25 | 15 | 25 | 35 |
| Thickness | mm | 0.275 | 0.275 | 0.275 | 0.319 | 0.26 | 0.28 |
| Moisture content | % | 0.29 | 0.35 | 0.44 | 2.8 | 2.54 | 2.61 |
| Humidity cycling shrinkage ratio | Warp direction | % | 0.00 | 0.00 | 0.20 | 2.50 | 2.40 | 2.40 |
| | Weft direction | | 0.00 | 0.00 | 0.29 | 2.00 | 2.00 | 2.00 |
| Surface resin | | Silicone | Silicone | Urethane | Silicone | Silicone | Silicone |
| Shape stability | Warping | A | A | B | C | C | C |

Working Example 1

Figure 2:
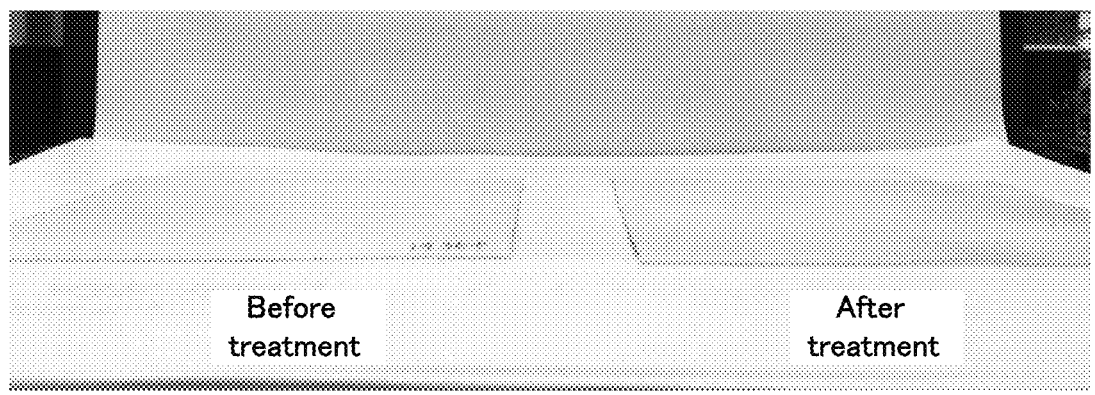
FIG. 2 is a photograph showing the result of a test of shape retainability on an air bag base cloth according to Working Example 1.

A plain woven fabric was produced using polyethylene terephthalate yarns having a total fineness of 470 dtex, a filament number of 96, and a single fiber fineness of 4.9 dtex for the warp and the weft, and scouring and setting were performed so as to obtain a fabric (base cloth main body) in which the weave densities were 51 yarns/2.54 cm in both the warp direction and the weft directions. One face of the obtained woven fabric was coated with a solvent-free liquid silicone resin whose main component is a polymer containing polydimethylsiloxane as the main chain and that has a viscosity of 25,000 mPa·s, using a knife-on-bed method such that the application amount was 15 g/m². Thereafter, curing was performed through thermal treatment at 180° C. for 1 minute, and thus an air bag base cloth with a moisture content of 0.29% was obtained. The measured humidity cycling shrinkage ratios of this base cloth were 0.0% in both the warp direction and the weft direction. As shown in FIG. 2, the base cloth was not deformed and warped after the cycling treatment, and the shape retainablility thereof against moisture was very good.

Working Example 2

One face of the same fabric as that in Working Example 1 was coated with a solvent-free liquid silicone resin whose main component is a polymer containing polydimethylsiloxane as the main chain and that has a viscosity of 25,000 mPa·s, using a knife-on-bed method such that the application amount was 25 g/m². Thereafter, curing was performed through thermal treatment at 180° C. for 1 minute, and thus an air bag base cloth with a moisture content of 0.35% was obtained. The measured humidity cycling shrinkage ratios of this base cloth were 0.0% in both the warp direction and the weft direction. The base cloth was not deformed and warped after the cycling treatment, and the ability to retain the shape thereof against moisture was very good.

Working Example 3

Figure 3:
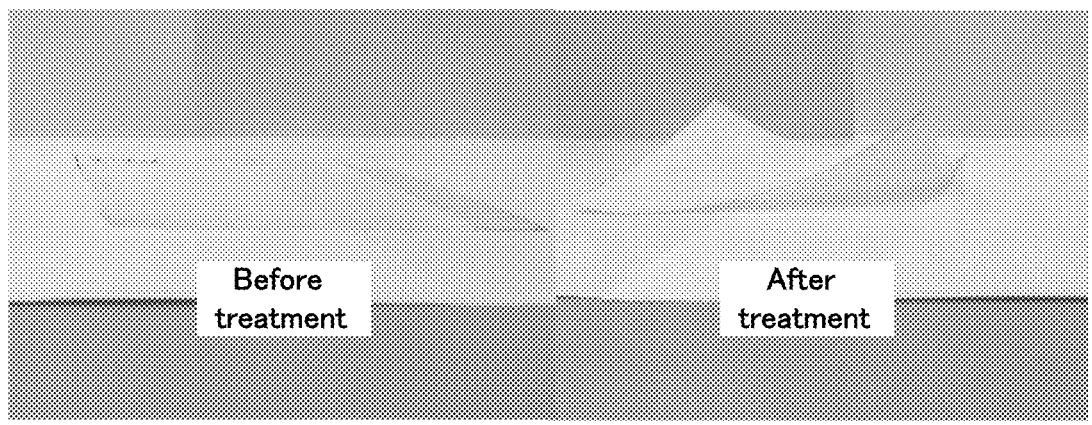
FIG. 3 is a photograph showing the result of a test of shape retainability on an air bag base cloth according to Working Example 3.

One face of the same fabric as that in Working Example 1 was coated with a solution obtained by diluting a urethane resin whose main component is polycarbonate-based polyurethane with a mixed solvent of dimethylformamide and methyl ethyl ketone so as to adjust the viscosity to 10,000 mPa·s, using a knife-on-bed method such that the application amount was 25 g/m². Thereafter, curing was performed through thermal treatment at 180° C. for 1 minute, and thus an air bag base cloth with a moisture content of 0.44% was obtained. The measured humidity cycling shrinkage ratios of this base cloth were 0.20% in the warp direction and 0.29% in the weft direction, and the base cloth was slightly shrunk as shown in FIG. 3. It is thought that this was because the urethane resin used in the coating was shrunk under the influence of moisture. The base cloth was slightly warped due to this shrinkage after the cycling treatment, and the ability to retain the shape thereof against moisture was good.

Comparative Example 1

Figure 4:
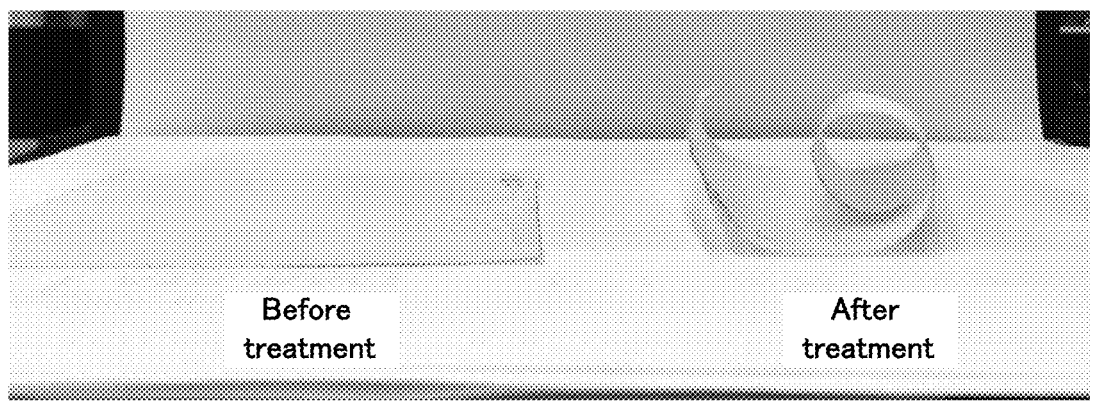
FIG. 4 is a photograph showing the result of a test of shape retainability on an air bag base cloth according to Comparative Example 1.

Comparative Example 1 was different from Working Example 1 in the fibers included in the base cloth main body. That is, an air bag base cloth with a moisture content of 2.80% was obtained in the same manner as in Working Example 1, except that polyamide 66 yarns having a total fineness of 470 dtex, a filament number of 72, and a single fiber fineness of 6.5 dtex for the warp and the weft were used. When this base cloth was subjected to the humidity cycling treatment, the humidity cycling shrinkage ratios were as large as 2.5% in the warp direction and 2.0% in the weft direction. As shown in FIG. 4, the base cloth was significantly warped after the cycling treatment, and the ability of this base cloth to retain the shape thereof against moisture was poor.

Comparative Example 2

Comparative Example 2 was different from Comparative Example 1 in the weave density of the cloth main body and the application amount of the synthetic resin layer. Other conditions were the same as those in Comparative Example 1. That is, the weave densities were 46 yarns/2.54 cm in both the warp direction and the weft directions, and the coating amount of the synthetic resin layer was 25 g/m². Thus, an air bag base cloth with a moisture content of 2.54% was obtained. When this base cloth was subjected to the humidity cycling treatment, the humidity cycling shrinkage ratios were as large as 2.4% in the warp direction and 2.0% in the weft direction. The base cloth was significantly warped after the cycling treatment, and the ability of this base cloth to retain the shape thereof against moisture was poor.

Comparative Example 3

Comparative Example 3 was different from Comparative Example 2 in the coating amount of the synthetic resin layer. Other conditions were the same as those in Comparative Example 2. That is, in Comparative Example 3, the coating amount of the synthetic resin layer was 35 g/m², and thus an air bag base cloth with a moisture content of 2.61% was obtained. When this base cloth was subjected to the humidity cycling treatment, the humidity cycling shrinkage ratios were as large as 2.4% in the warp direction and 2.0% in the weft direction. The base cloth was significantly warped after the cycling treatment, and the ability of this base cloth to retain the shape thereof against moisture was poor.

The invention claimed is:
1. An air bag base cloth comprising:
   a base cloth main body formed of synthetic fibers; and
   a synthetic resin layer with which at least one face of the base cloth main body is coated,
   wherein the base cloth main body is coated with the synthetic resin layer in an amount of to 40 g/m²,
   the synthetic fibers include one or more types of fibers selected from polyester-based fibers, polyolefin-based fibers, fluorine-based fibers, and polyphenylene sulfide fibers,
   a weave density of the base cloth main body is 48 to 52 yarns/2.54 cm, and
   a total moisture content of the base cloth main body and the synthetic resin layer measured in accordance with JIS L 1096.8.10 is 0.5% or less.
2. The air bag base cloth according to claim 1, wherein polyethylene terephthalate is used as a main material of the fibers included in the base cloth main body.
3. The air bag base cloth according to claim 1, wherein silicone resin is used as a main material of the synthetic resin layer.
4. The air bag base cloth according to claim 1, wherein the base cloth main body is coated with the synthetic resin layer in an amount of 10 to 30 g/m².

5. The air bag base cloth according to claim 1, wherein the weave density of the base cloth main body is 48 to 51 yarns/2.54 cm.

6. The air bag base cloth according to claim 1, wherein the number of yarn filaments in the base cloth main body is 72 to 182 filaments.

7. An air bag formed of at least the air bag base cloth according to claim 1.

* * * * *